US012623176B1

(12) United States Patent
Fields

(10) Patent No.: US 12,623,176 B1
(45) Date of Patent: May 12, 2026

(54) FILTER CHANGING NOTIFICATION SYSTEM

(71) Applicant: Melvin Earl Fields, Myrtle Beach, SC (US)

(72) Inventor: Melvin Earl Fields, Myrtle Beach, SC (US)

( * ) Notice: Subject to any disclaimer, the term of this patent is extended or adjusted under 35 U.S.C. 154(b) by 311 days.

(21) Appl. No.: 18/519,648

(22) Filed: Nov. 27, 2023

Related U.S. Application Data

(60) Provisional application No. 63/433,926, filed on Dec. 20, 2022.

(51) Int. Cl.
*B01D 46/00* (2022.01)
*B01D 46/88* (2022.01)
*G08B 21/24* (2006.01)

(52) U.S. Cl.
CPC ......... *B01D 46/88* (2022.01); *B01D 46/0086* (2013.01); *G08B 21/24* (2013.01)

(58) Field of Classification Search
CPC ........................... B01D 46/88; B01D 46/0086; B01D 46/0005; B01D 46/0006; B01D 46/0009; B01D 46/0084; G08B 21/24
USPC ........ 95/273; 96/417, 421, 424; 55/493, 506
See application file for complete search history.

(56) References Cited

U.S. PATENT DOCUMENTS 2,792,908 A    5/1957    Glanzer
4,221,576 A    9/1980    Phillips, Jr.

5,236,478 A *    8/1993    Lewis ..................... B01D 46/10
                                                              55/495
6,007,169 A *   12/1999    Li ......................... H05K 7/1425
                                                              312/319.1
6,214,074 B1 *   4/2001    Silviera ................... F24F 8/108
                                                              55/471
2013/0074460 A1 *  3/2013    Sakuragi ................ B01D 46/42
                                                              55/471
2022/0057099 A1   2/2022    Clement et al.

FOREIGN PATENT DOCUMENTS

CA        1145684 A      5/1983
CN       102422094 A     4/2012
JP      2008049329 A     3/2008
KR      101039486 B1     6/2011
KR    20120001355 A      1/2012

* cited by examiner

*Primary Examiner* — Frank M Lawrence, Jr.
(74) *Attorney, Agent, or Firm* — John Rizvi; John Rizvi, P.A.—The Patent Professor ®

(57) ABSTRACT

A filter change notification system is disclosed for use in filtration equipment, including HVAC systems. The system includes a substantially flat, rigid filter mounted on a movable filter tray configured to transition between closed and open positions. The tray includes an airflow opening permitting continued air passage while the filter is installed. The tray is electrically coupled to a filter ejection system comprising a determining component operative to identify a filter-change interval and actuate an associated relay. Activation of the relay drives a mechanical actuator that displaces the filter tray from the closed position to the open position. A notification device, electrically linked to the actuator, provides a visual or electronic alert to a user indicating that the filter has reached its replacement interval and is ready for manual removal and installation of a new filter.

20 Claims, 9 Drawing Sheets

FILTER CHANGING NOTIFICATION SYSTEM

CROSS-REFERENCE TO RELATED APPLICATIONS

This application claims the benefit of U.S. Provisional Patent Application Ser. No. 63/433,926, filed on Dec. 20, 2022, which is incorporated by reference herein in its entirety.

FIELD OF THE INVENTION

The present invention relates generally to the field of filters. More particularly, the present invention relates generally to filters employed in HVAC systems.

BACKGROUND OF THE INVENTION

With the development of science and technology, the design and application of various systems have been brought to bear to make people's lives more convenient, and gradually improve the quality and purity of their living environment. One factor in improving people's daily living environment, health, and comfort, is the advent of the ability to control the room temperature, humidity, and/or the quantity of particulate matter in a business or residence. Since air conditioning equipment has been developed it has evolved to be nearly omnipresent, especially in areas of the country that have prolonged spells of high heat or humidity. For some, such those who are prone to excessive heat or humidity it has become an indispensable factor in daily life.

One of the most crucial components for human health and quality of life in air conditioning system is the air filter that is employed. Air filters essentially act as a dust collector, and a means for removing for fine particles flow which could otherwise enter into the equipment from the air intake of the air conditioning equipment and/or the air outlet of the air conditioning equipment. Further, by removing various contaminants from the air such as various particles, the air eluted from the air conditioning system is greatly improved in overall quality.

However, one factor in employing an air filter in an air conditioning system is that the air filter eventually becomes clogged with particulate material and thus loses a great deal of its efficacy. In addition, a clogged air filter imposes a great burden on the electronic components of the HVAC system, which if left untreated can cause damage thereto and eventually result in system failure.

Nonetheless, it is not always an easy task to remove, clean or replace an air filter in an HVAC system. Quite often the filters are located in ceiling locations since such provides for the best air circulation and the least dust to enter the system. Thus, such usually requires a ladder to be employed to reach the air filter location. Besides the clear fall risks associated with the use of ladders, the filter must usually have a cover thereover removed which can entail the removal of various fasteners or clips. Thus, this often is an arduous and tedious task which leads many home owners to postpone the need for replacing the air filter in their HVAC system.

Further, even when filters are not necessarily located in high locations, they are usually secreted behind closet doors, or the like, which is done for aesthetic purposes. While this removes the visual eyesore of the HVAC system, it likewise tends to cause homeowners to forget about their HVAC system, and the need to periodically replace the air filters therein. One reason is that most HVAC system filters are usually replaced between 1-4 months apart, and after such a prolonged period of time between changes, the homeowner will forget the necessary replacement period.

Even if a homeowner does remember the need for filter replacement, rarely does a homeowner put such an item on a calendar as an action item. Thus, when it is remembered, the homeowner must remove the air filter to ascertain if the filter has reached a level of dust accumulation which would require its replacement. The movement of an air filter in and out of an HVAC system can cause some of the accumulated dust and particulate matter on the filter to inadvertently enter the HVAC system, which as noted above, can be damaging to the system. On the other hand, merely removing the air filter and replacing it with another air filter whenever the homeowner remembers to do so may be costly if the filter is replaced prior to the proper time or need for doing so.

Accordingly, there remains a need for a solution to at least one of the aforementioned problems. For instance, there is an established need for a means to ascertain when the air filter of an HVAC system needs to be replaced which does not require the use of ladders or the actual removal and checking of the filter surface.

SUMMARY OF THE INVENTION

The present invention can be directed to a filter changing notification system for an HVAC system, which can cause the filter to be partially ejected from the system when it reaches a set point of accumulation or a period of time. In addition, along with the partial ejection, the system sends a notification to the user, e.g., on their cell phone, to inform the user it is time to replace the filter. Such system provides for a readily noticeable state that the filter needs to be replaced, which can facilitate a more precise and timely replacement of the filter, which in turn, improves the efficacy of the HVAC system and maximizes filter life for the user.

In a first implementation of the invention, there can be provided a filer changing notification system comprising:

a filter tray for supporting a filter in an open or closed filter tray position, and which filter tray has a substantial opening therein;

a filter ejection system connected to the filter tray, which filter ejection system comprises:

a determining component that determines a filter change time, a relay electrically connected to the determining component, which relay is triggered by the filter change time, and a mechanical actuator electrically connected to the relay, which mechanical actuator ejects the filter tray from the closed position to the open position when the relay is triggered.

In a second implementation of the invention there can be provided a filter changing notification system comprising:

a filter tray for supporting a filter in an open or closed filter tray position, and which filter tray has a substantial opening therein;

a filter ejection system connected to the filter tray, which filter ejection system comprises:

a determining component that determines a filter change time, a relay electrically connected to the determining component, which relay is triggered by the filter change time, and a mechanical actuator electrically connected to the relay, which mechanical actuator ejects the filter tray from the closed position to the open position when the relay is triggered; and, a notification device that is electrically connected to the mechanical actuator and which informs a user with a notification that a filter is ready for manual replacement.

In a third implementation of the invention there can be provided a filter changing notification system comprising.

a single substantially flat and substantially rigid filter;

a filter tray for supporting the filter in an open or closed filter tray position, and which filter tray has a substantial opening therein;

a filter ejection system connected to the filter tray, which filter ejection system comprises:

a determining component that determines a filter change time, a relay electrically connected to the determining component, which relay is triggered by the filter change time, and a mechanical actuator electrically connected to the relay, which mechanical actuator ejects the filter tray from the closed position to the open position when the relay is triggered; and, a notification device that is electrically connected to the mechanical actuator and which informs a user with a notification that the filter is ready for manual replacement.

In one aspect of the invention, the filter changing notification system is an HVAC filter changing notification system, e.g., an air filter or a furnace filter. In another embodiment, the filter changing notification system can be use in air conditioning equipment such as residential HVAC air conditioner systems, portable/window air conditioners, air purifiers, heaters, dehumidifiers and the vent in clothes driers.

In another aspect of the invention, the filter changing notification system can comprise in a non-limiting embodiment, only one substantially flat and substantially rigid filter.

In yet another aspect of the invention, the expression "substantially flat" is understood to mean that the filter does not have visually appreciable height beyond 1 to 4 inches in height, preferably about 1 inch in height, and may include a pleated filter material that is encapsulated in a framing material around the filter, e.g., cardboard or plastic, the overall filter not being in excess of the noted height. The term substantially flat can also encompass foam filters or web-material filters whose overall height is within the noted dimensions despite any cavities or pores in the filter.

In yet even another aspect of the invention, the expression "substantially rigid" is understood to mean that the filter does not bend when held by one corner or one end thereof, such as by one corner or end of the frame surrounding the filter in its commercially available form and maintains is overall shape and does not collapse, droop, or bend more than 10 degrees when held by a user on one corner or end.

In yet one other aspect of the invention, wherein the filter has an intended direction for placement in the system in terms of air flow.

In yet even one other aspect of the invention, the filter can have length dimensions of from about 12 inches to about 36 inches, preferably from about 16 inches to about 30 inches and most preferably from about 18 inches to about 25 inches. In another embodiment, the width of the filter can be from about 12 inches to about 25 inches, preferably from about 16 inches to about 23 inches, and from about 18 to about 22 inches. Some suitable non-limiting examples of suitable dimensions for the filter can be those selected from the group consisting of 20×20×1; 16×25×1; 20×25×1;

20×25×4, 16×20×1; 16×25×4; 20×30×1; 12×12×1; 14×14×1; and 14×20×1, said values being in inches.

In yet still one other aspect of the invention, filter can be of any suitable material such as spun fiberglass material, pleated paper or cloth, and such materials are generally enclosed in a cardboard frame. The filter can be any of the non-limiting examples of a high-efficient particulate air (HEPA) filters, for example removing at least 99.97% of particles having diameters of 0.3 microns from the air passing through the filter and improving in performance for other diameters. In some embodiments, the filter may be configured to remove approximately 95% of airborne particles having a most penetrating particle size, for example around 0.3 microns, which may correspond to the filtration efficiency of medical-grade respirator masks (e.g., N-95 rated). Filters of various materials, fiber diameters, thicknesses, porosities, etc. can be used to achieve these levels of filtration while also allowing for sufficient airflow through the filter. In some embodiments, the filter may be a filter specifically adapted to capture and/or neutralize (kill, disable, render harmless) airborne pathogens. For example, copper or other conductive materials may be included which are known to destroy viruses or other pathogens which are trapped in contact with such surfaces. As yet another example, the filter may be an electrostatic filter, for example an electrostatic filter having a set of charged wires that ionize particles in the air and a set of collector plates (surfaces, etc.) which are charged to attract the ionized particles, thereby providing a high level of air cleaning. Various designs are possible in various embodiments of the filter.

In some embodiments, the filter can be enhanced an ultraviolet light source configured to provide ultraviolet germicidal irradiation using short-wavelength ultraviolet (e.g., UV-C) light to kill or inactivate microorganisms.

In one aspect of the invention, the filter changing system described herein, and all of its components, can be made to fit any ventilation or HVAC system and a person of ordinary skill in the art would be able to modify the filter changing system accordingly.

In yet still even another aspect of the invention, the filter tray can be oriented in a vertical or horizontal orientation. In one preferred embodiment, the filter tray is a horizontally ejecting tray, e.g., such as in the same orientation as a CD or DVD tray. In another embodiment, the filter tray is an angled drop down configuration, e.g., such as is the orientation in a set of attic stairs.

In another aspect of the invention, the filter tray can have the same dimensions as the filter described herein above. In another embodiment the filter tray can be recessed from 1 to 4 inches to accommodate part of, or the entire height of the filter as described herein above. Preferably, the filter tray has a recessed shape and a border around the inside of the recessed tray, which border is indented from about 1 to 4 inches from the side of the tray, the remaining area being open space. In another embodiment, the filter tray can have an indented border as described herein but can instead be in the shape of a circle. The expression "substantial opening" in the tray can comprises wherein the area of the tray has an opening which occupies at least 60% of the area of the tray, preferably at least 75% of the area of the tray and most preferably at least about 85% of area of the tray, and more preferably wherein the opening is circular.

The filter tray can also have a support mechanism over the substantial opening so as to better support the central part of the filter. For example, in the CD-tray type orientation, one non-limiting example of the support mechanism can be a single cross pattern of two intersecting plastic supports formed into the bottom of the tray. Alternatively, in the drop down attic stairs type orientation, the support mechanism can be a grid of lines which are made of plastic or thin metal which support the filter as air pulls through the filter and into the HVAC system. In one embodiment, in the attic drop down orientation, the filter tray can be slid down on a track from with or without an overlying ceiling cover. The track on which the filter tray is slid down on can be any size and can equal one, two or three, times the dimensions of the filter tray itself, preferably wherein the length of the extension track is at least two times the length of the filter tray. In another embodiment, the ceiling in which the system herein is located is an acoustic drop down tray ceiling which has a series of acoustic tiles supported on the ceiling tray. The track on which the filter tray is slid down on can equal one, two or three or more, times the length of a ceiling tile in a ceiling in which the system is located, thus bringing a ceiling which is normally twelve feet down with the extended track on which the filter tray lies, down to a more accessible 8 feet. Likewise, an 8 foot ceiling could be brought down to 6 feet for access as well. In a further embodiment, the filter changing notification system described herein can also comprise a hand held rod of any where from 2 feet up to about 10 feet, preferably from 4 to 8 feet, which can be adjustable in length, and may have a component on one thereof which is made or rubber or plastic in the shape of the letter "L" or "U-shaped" and which permits a user to push a filter tray back into the closed position without the need of employing a ladder.

In yet another aspect of the invention, the filter ejection system can be connected to the filter tray by the mechanical actuator of the filter ejection system. In one embodiment, the filter changing notification system can be manually opened by actuating a mechanical actuator without any need for electric power or electronic components. In one non-limiting embodiment of the filter ejection system, the mechanical actuator can be connected to the filter ejection system by a spring being held in a retained position by a fastener, such as the non-limiting example of a clasp, lip, hook or the like, which fastener is released upon activation by linear motion obtained from the mechanical actuator which is activated by the electrical energy obtained from the relay, which is triggered by the determining component. The spring when held in the retained position by the clasp can comprise when the filter tray is in the closed position, and its release can cause the filter tray to be opened to its open position. The strength of the spring can be chosen based upon the materials of the filter tray, the weight of the filter, the orientation of the system and other factors known to those of ordinary skill in the art to achieve the ejection of the filter tray to a certain distance from its closed position. The filter ejection system can involve the use of the same mechanically actuator in the system or optionally, an additional mechanical actuator which can be manually actuated to open the filter ejection system without electrical power or electrical components being necessary.

In another embodiment, the filter ejection system can be connected to the filter tray by the mechanical actuator of the filter ejection system, which mechanical actuator can be part of a magnetic attachment system (one attaching an outer cover and the filter apparatus to a metal border of the filter access area), which can be used in the drop-down attic system, which can also involve an interaction of a lip and an aperture for holding the lip in the filter ejection system. Those skilled in the art would appreciate the mechanism of action of the mechanical actuator on the proper magnetic and/or lip aperture system which can be used to retain and release the attic drop down system. In the scenario of the horizontal CD like ejection, the mechanical actuator can be actuated by a belt and pulley system that is powered by an electric motor connected to the relay and/or the mechanical actuator. The belt and pulley system can be one known to those of ordinary skill in the art of CD-type opening devices.

In yet even another aspect of the invention, the filter tray can be part of a vertical wall vent, in a similar orientation to that of the ceiling attic drop down system described herein, and when the vent is opened in the open position, e.g., by the same magnetic system or lip/aperture system, can cause the filter tray to be ejected at an angle, down from the wall surface, along an extension of a overlying vent cover which also drops down, so that the visual presence of the ejected filter tray downward at an angle makes it apparent to a user that the filter needs to be replaced.

In yet one other aspect of the invention, that upon ejection of the filter tray, the user can open the filter tray to a completely open position, if such is not already the case, and replace the filter in the filter tray, and return it to a closed position, e.g., wherein the clasp and spring hold the tray closed, the magnet is re-applied to the magnetic attachment, or where the lip is reinserted into a holding aperture, or still further when the belt and loop fastener is rewound to a preset position by the electric motor to retain the filter tray closed.

In yet still one other aspect of the invention, the determining component of the filter ejection system can be any component that can indicate a filter change time, such as any of once every one month, every two months, every three months, and every four months, and such can be either battery powered or electrically connected to a source of electrical current. The determining component can be one that works based upon the level of accumulation on the filter, such that filter change time is reached when a level of air flow through the filter is sufficiently impeded to produce an electric signal or current to the relay. For example, such a determining component can be a pressure transducer which can be electrically connected to the relay, and such components and their connection means are known to those of ordinary skill in the art. Thus, when the air pressure on one side of the air filter compared to the other side of the filter reaches a distinct difference in pressures, the pressure transducer can be activated to produce an electrical signal to the relay. Since such differences in pressure can be affected when the accumulation of dust and particulate matter reaches a certain point, those skilled in the art can determine what that difference point should be and to set the pressure transducer to actuate at that specific point in difference of pressures.

In yet still even another aspect of the invention, the determining component can be a timer, such as those employed in security lighting and the like and the timer can be programmable to a specific period of time as set out above, e.g., one month (e.g., 30 days), two months (e.g., 60 days) etc., at which time they can send out an electric current to the relay to which the timer is electrically connected. Thus, in such a scenario the filter change can occur on an exact time schedule as opposed to the loading level of accumulated material on the filter as set out above.

In another embodiment, the determining component can cause an audible alarm to issue, so as to inform a person that the filter needs to be changed.

In yet another aspect of the invention, the relay can be any commercially available relay such as those which would be known to those of ordinary skill in the art. a timer, which timer is triggered once the electrical current from the timer flows after the triggering event, i.e., the end of the timed period as described above, i.e., the filter change time. The relay is connected to the actuator also by a wire and the actuator operates as noted above to eject the filter tray to an open position. In another embodiment, the relay can be electrically connected by a wire to the determining component, e.g., to a pressure transducer, which is triggered once the pre-determined difference in pressure between two sides of the filter is determined. Again, in this latter scenario, the relay is connected to the actuator also by a wire and the actuator operates as noted above to eject the filter tray to an open position.

In one aspect of the invention, the mechanical actuator can be any commercially available mechanical actuator which can perform a movement in a linear direction, e.g., wherein the linear motion can thus, cause a clasp to be removed from a spring, cause an electric motor to be activated, can press against a lip to cause it to be removed from an aperture, and any linear motion which can cause a filter tray to be ejected into the open position as described herein. The electric connection of the mechanical actuator can be by wire as would be known by those of ordinary skill in the art.

In another aspect of the invention, in response to detecting that the mechanical actuator has been actuated, a notification is generated indicating that the filter should be replaced (e.g., discarded and replaced with a new filter or cleaned for re-use). For example, the notification can be generated and pushed to a user device (e.g., smartphone, laptop) to inform a maintenance person or a homeowner, that the filter should be replaced. In some embodiments, the system is also controlled to take automatic action in response to determining that the filter should be replaced. For example, as discussed above, an automatic sterilization or cleaning process can be performed on the filter to be removed. As another example, in some embodiments it may be possible to clean the filter and return the filter for re-use, in which case a cleaning process may be performed using some automatic mechanism. Preferably the filter is removed from the filter tray and replaced with a new filter and the system is reset as noted above, which can also include resetting the pressure transducer, timer or other determining component used.

In a second implementation of the invention there can be provided herein a method of notifying a user of a filter change time comprising:
  providing the filter changing notification system described above to a filtration system;
  waiting to receive the notification from the notification device; and,
  replacing the filter manually in the filter tray;
  placing the filter tray in the closed position; and,
  resetting the determining component.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

8

Figure 1A:
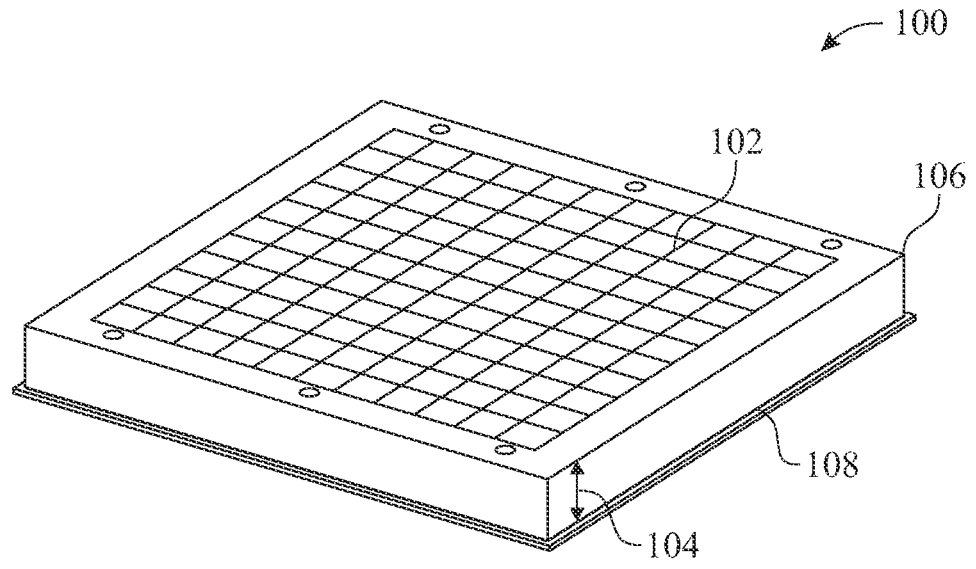
FIG. 1A present a top view of an attic stairs type drop-down filter from the view of the inside of the HVAC filter system.
Figure 1B:
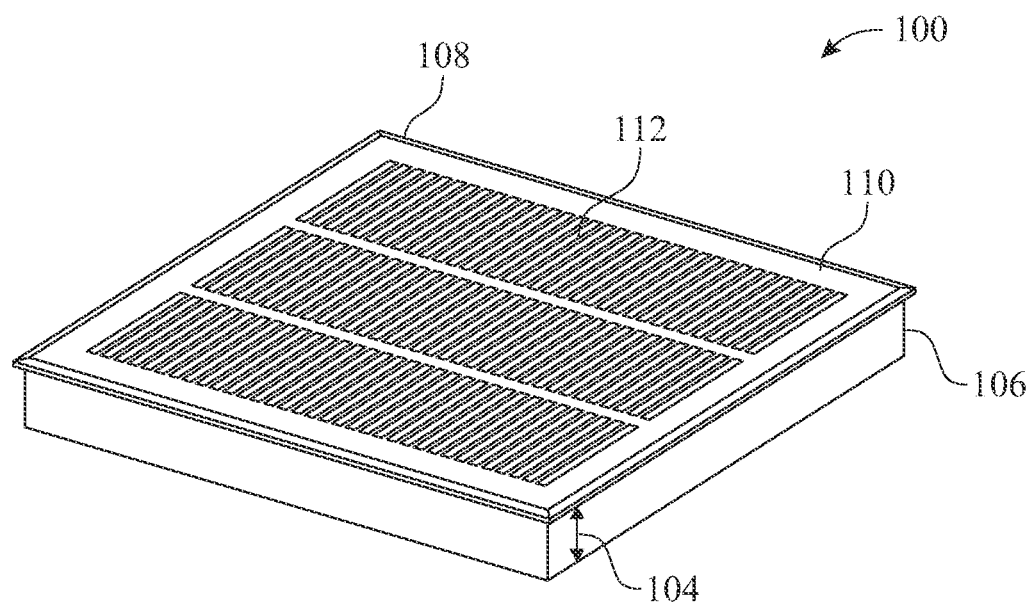
Figure 2:
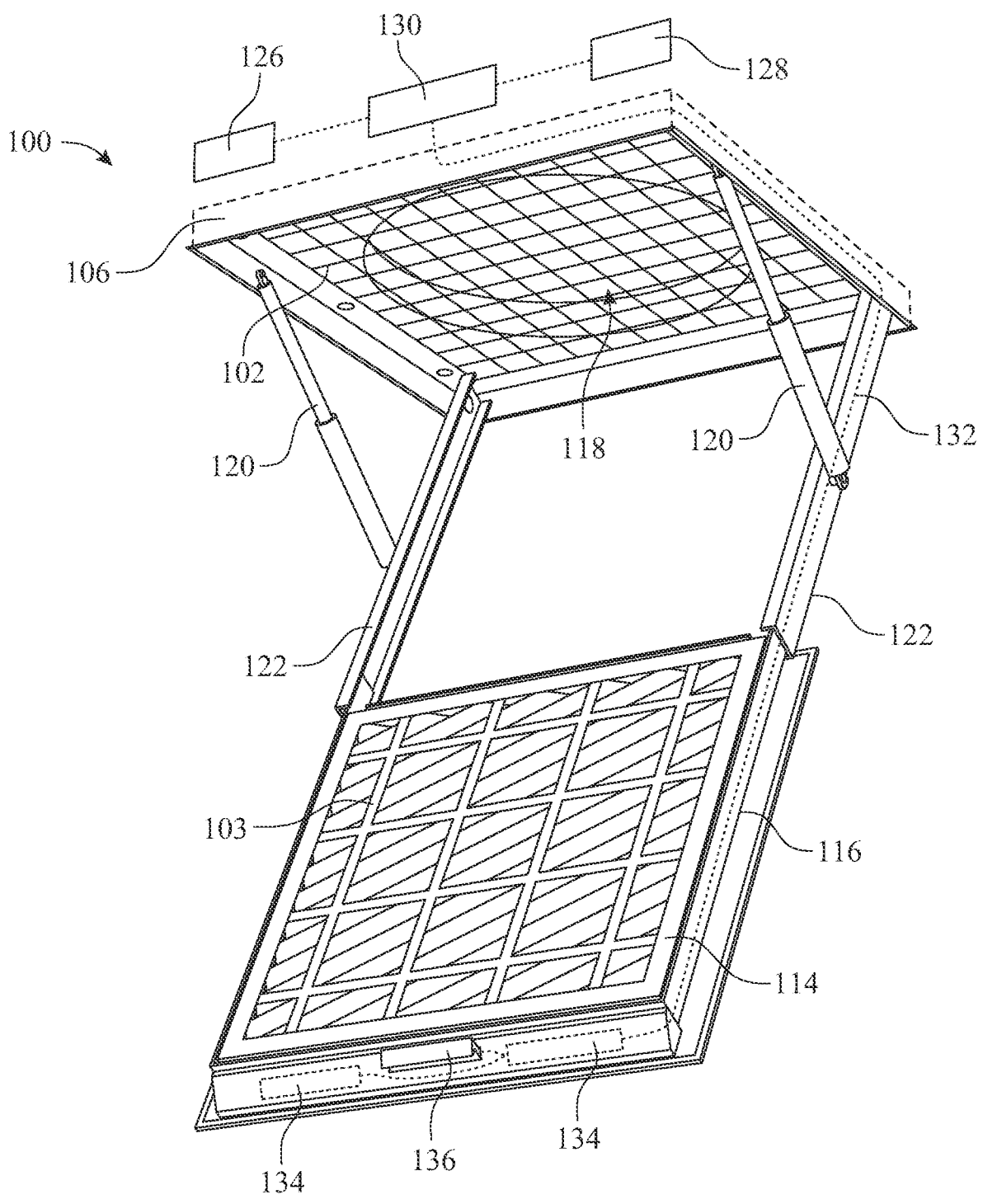
Figure 3:
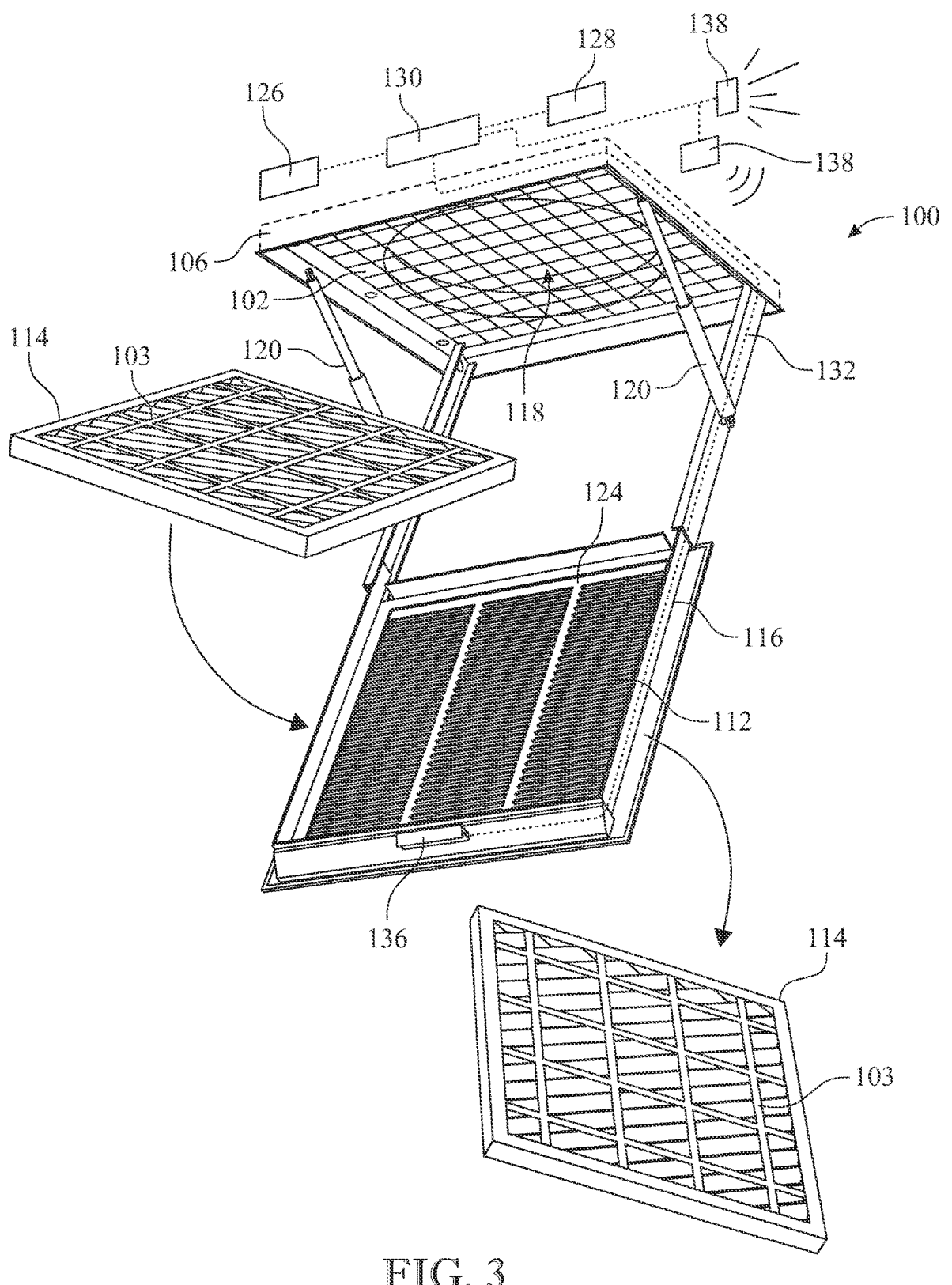
Figure 4:
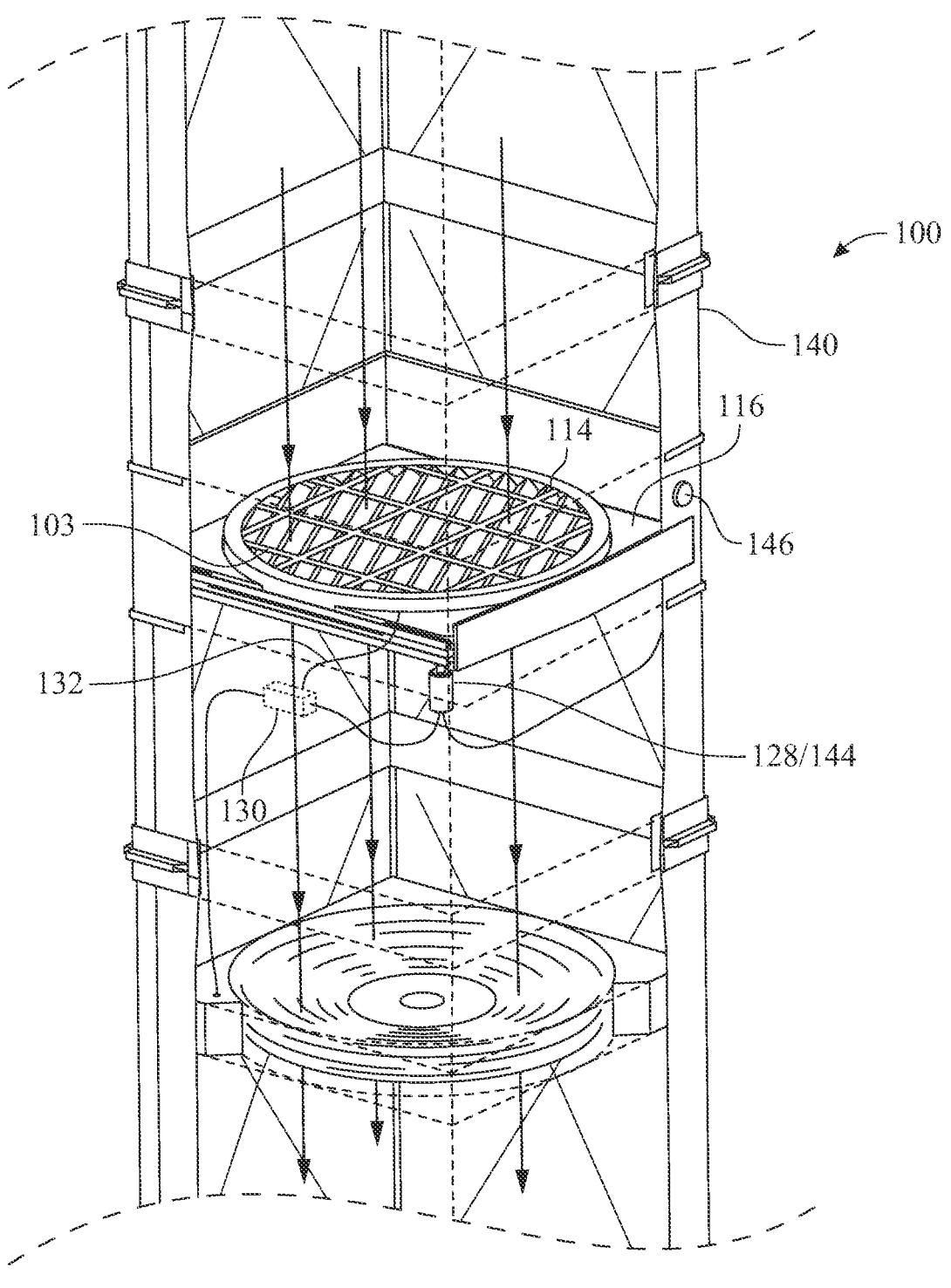
Figure 5:
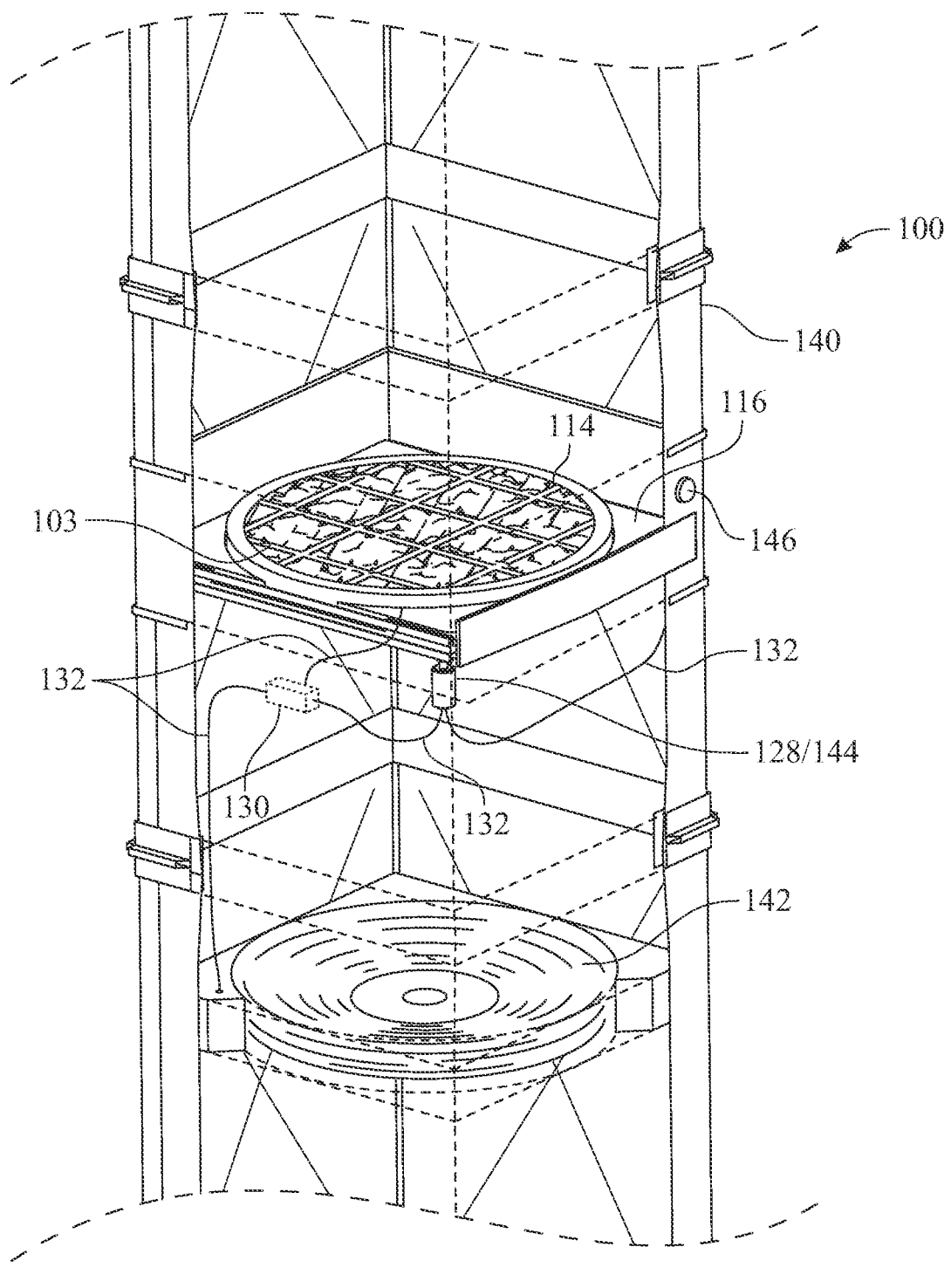
Figure 6:
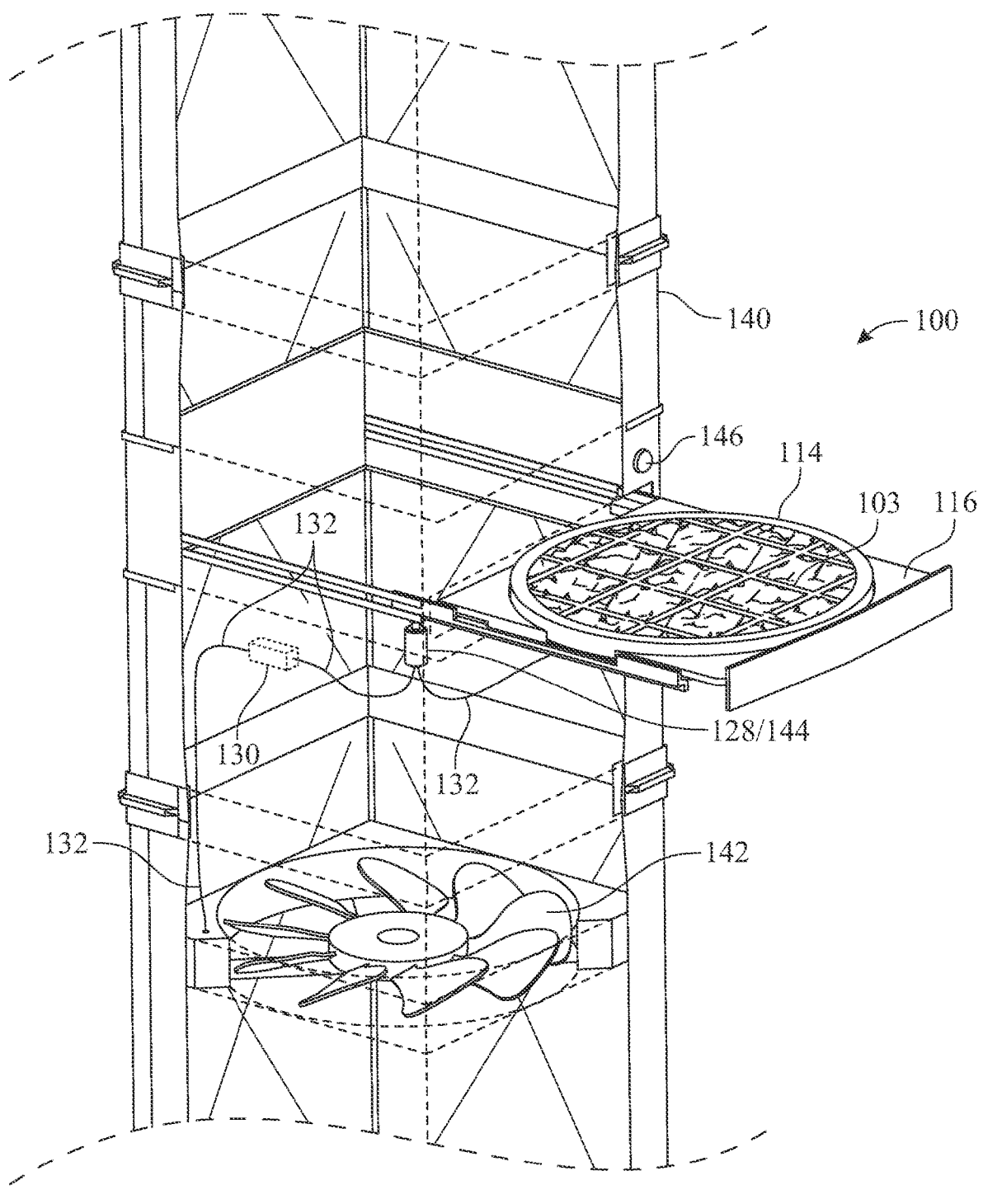
Figure 7:
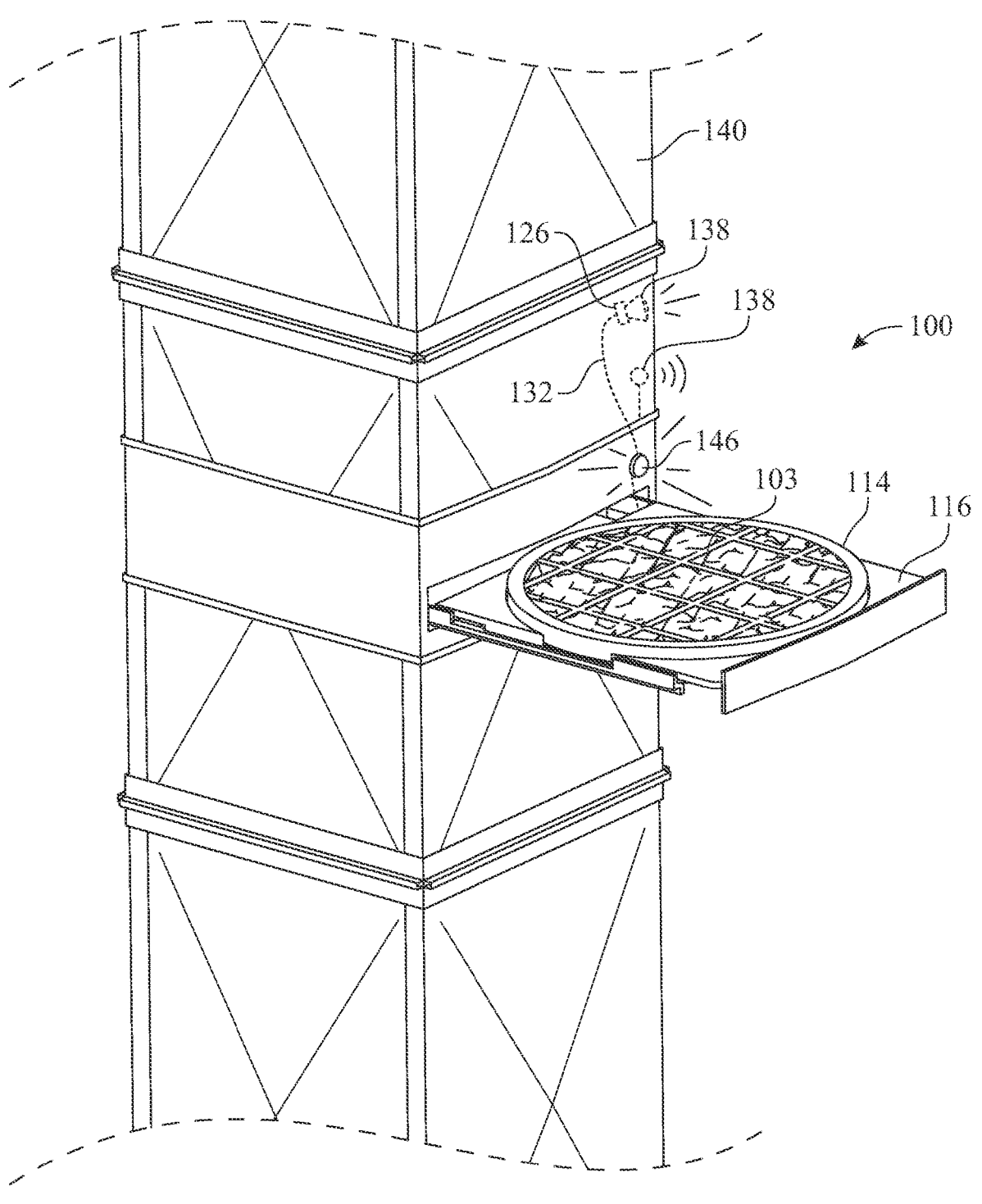
Figure 8:
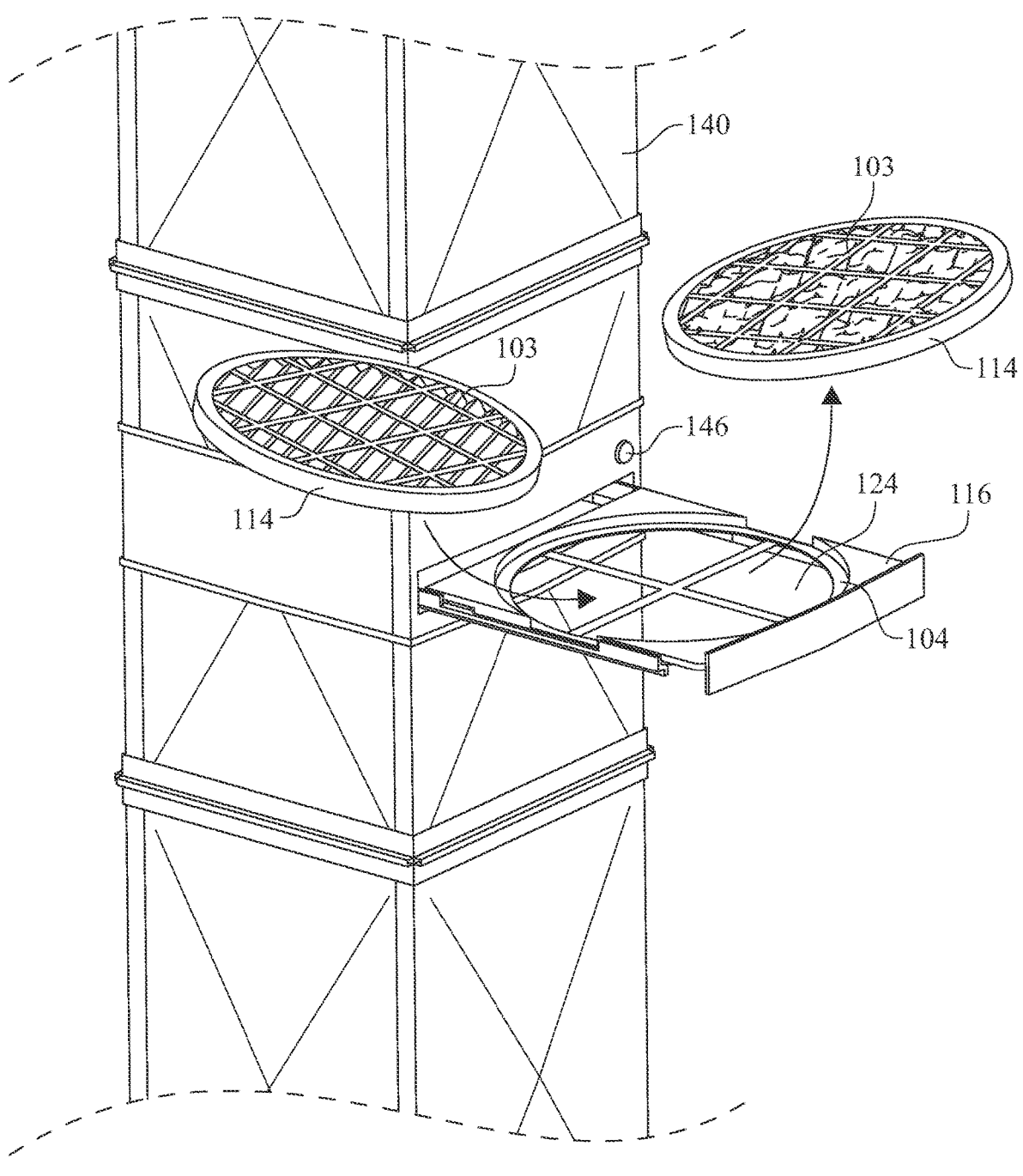
Figure 9:
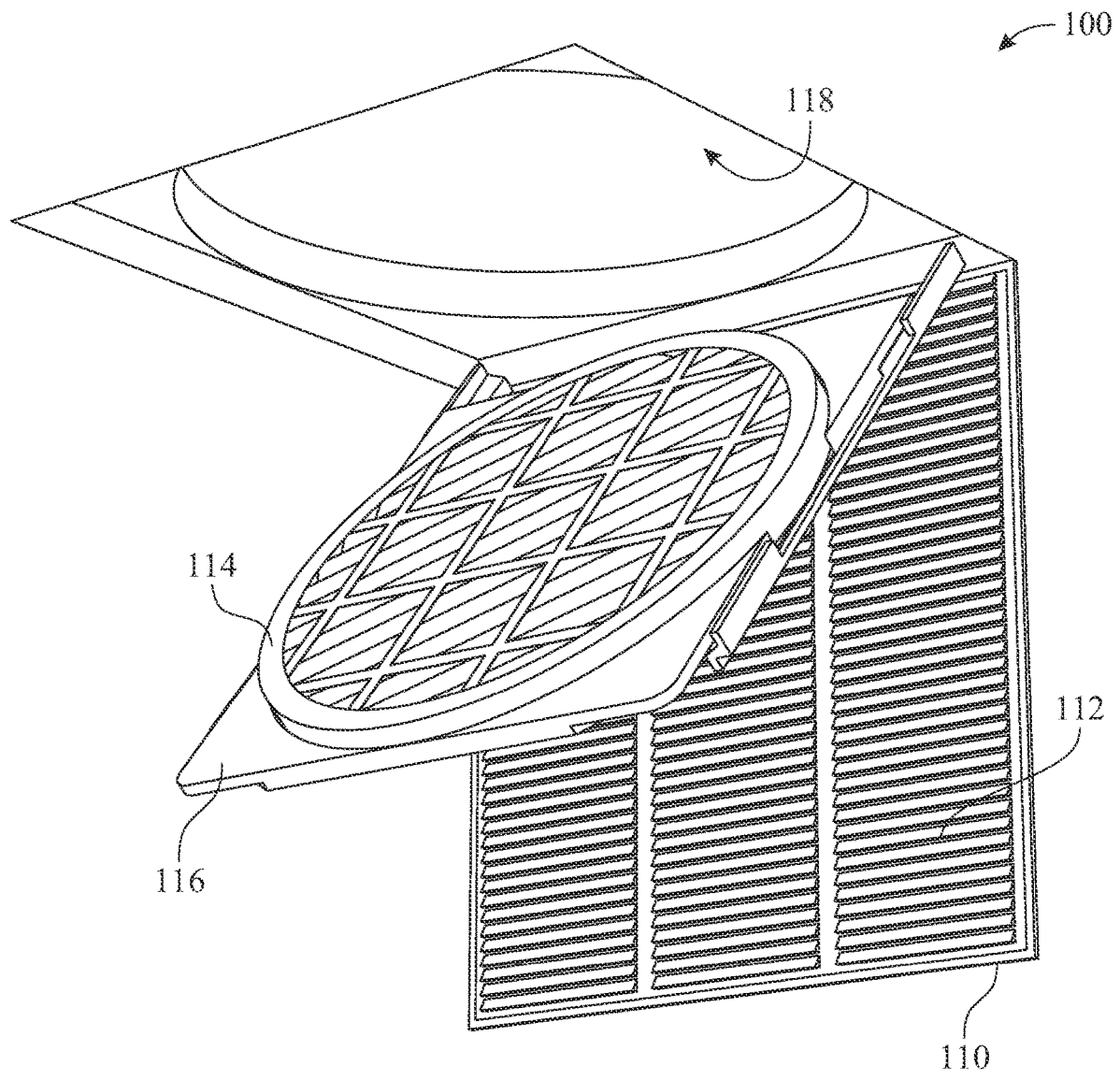

FIG. 1B presents a bottom view of an attic stairs type drop-down filter from the view of the outside of the HVAC filter system;
  FIG. 2 presents a view of the attic stairs type drop-down filter tray in the open position with the filter in place and extended along a filter tray extension;
  FIG. 3 presents a view of the filter tray of FIG. 2, showing the removal and replacement of the filter therein;
  FIG. 4 presents a side perspective view of a CD type filter tray in an HVAC system, e.g., in a position on an air handler and showing the direction of air flow
  FIG. 5 presents the filter tray of FIG. 4 without the air flow being shown;
  FIG. 6 presents the filter tray of FIG. 5, with the filter tray ejected in a CD orientation over a stopped HVAC fan;
  FIG. 7 presents an external view of the filter tray of FIG. 5 with the filter tray ejected in a CD orientation and showing attachment of the relay to a timer as the determining component;
  FIG. 8 present the same view as FIG. 7 but showing the removal and replacement of a filter in the filter tray of the HVC system; and,
  FIG. 9 presents an attic stairs type drop-down circular filter from the view of the outside of the HVAC filter system, wherein the filter tray is shown in its open position.
  Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIGS. 1-6. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The term "comprising" as used herein also encompasses the terms "consisting essentially of" and "consisting of".

The terms "CD" or "DVD" in terms of the system described herein pertains to the horizontal ejecting system that is also seen in a system such as a DVD player, a CD player or VHS device, and it is understood that the system will eject either quickly or slowly, a filter tray such that it is available for access in terms of removal and replacement in the filter tray.

The expression "attic drop down stairs" and equivalents thereto shall be understood to apply to the system described herein as a means of describing the orientation and angled position of a filter tray, which is in its closed position is flush with or inserted into the ceiling of the room in which the system exists, and when opened, i.e., when the filter tray is opened, the tray, and any overlying cover, is angled down at an angle of from about 30 degrees to about 60 degrees, preferably from about 40 degrees to about 50 degrees, most preferably about 45 degrees from the planar surface of the ceiling, and the filter tray may then also be extended along a pair of opposing extension lengths as described herein. In another non-limiting embodiment, after dropping down, the filter tray itself could be removed, reversed in direction, and then used alternatively in wall mounted system instead of a ceiling attic type system.

Referring initially to FIGS. 1-9, there is provided a filter changing notification system 100, hereinafter, "filter changing system 100". The filter changing system 100 shown in FIG. 1A is a view of the filter changing system 100 from a top view which illustrates the grid-like support system 102 which is used to support a filter (not shown) in the filter tray (not shown). FIG. 1A illustrates a non-limiting example of the attic stair drop down orientation for the filter system. The filter changing system in FIG. 1A shows the recess 104 in the housing 106 of the filter changing system 100. The filter changing system 100 can have a lip 108 on a side opposing the grid-like support system 102, which lip can be used the affix the housing 106 of the filter changing system 100 to a ceiling (not shown) or vertical wall (not shown).

Referring now to FIG. 1B, the filter changing system 100 is shown from a bottom view, i.e., wherein the cover 110 for the housing 106 of the filter changing system 100 is shown from the view it would be visible from below when installed in a ceiling or wall, i.e., a viewer would be looking into cover 110. The cover 110 can have venting 112 which permits access of air to the filter changing system 100.

Referring to FIGS. 2 and 3, the filter changing system 100 can have a single, i.e., one, substantially flat and substantially rigid filter 114. The filter changing system 100 is shown from the view point of one looking up at the ceiling (not shown) wherein the filter changing system 100 has opened and the filter tray 116 is in an open position. The grid like support system 102 is over an HVAC opening 118, which is circular. The filter changing system 100 can be ejected into the open position shown or retracted therefrom by employing the hydraulic pistons 120. The hydraulic pistons 120 are affixed at one end thereof to a filter tray extension 122 which permit the filter tray 116 to be lowered to a lower position when open. The filter tray 116 can be connected by conventional fasteners to the filter tray extensions 122, and such can be operated as would be appreciated by those skilled in the art. Referring now to FIG. 9, an alternative embodiment may be provided wherein the HVAC opening 118 does not contain a grid like support system 102 such as in FIGS. 2-3, but rather just the opening 118. The filter tray 116 can have thereover the cover 110 containing the venting 112. Any of the filters 114 herein can have a grid like pattern 103 over the filter to maintain the filter 114 in a tight rigid format.

Referring more specifically to FIG. 3, the filter tray 116 can have a substantial opening 124, which comprises the open space within the borders of the filter tray 116. The reverse side of the venting 112 is seen therein, which underlines the substantial opening 118. Referring back to both FIGS. 2 and 3, the filter changing system 100 can contain a filter ejection system which can contain a determining component which can be a timer 126 or alternatively, a pressure transducer 128 which determines a filter change time as described herein. In addition, the filter ejection system can contain a relay 130 which is electrically connected by a wire 132 to the determining component 126/128, which relay 130 is triggered by the filter change time. The triggering of the relay 130 can be induced by the determining component 126/128 sending an electric signal or current to the relay 130. The filter ejection system can also contain a mechanical actuator 134 which is electrically connected to the relay by the wire 132, and which mechanical actuator 134 ejects the filter tray 116 from the closed position (not shown) to the open position shown in FIGS. 2 and 3, when the relay 130 is triggered by the electric signal or current from the determining component 126/128. Referring more specifically to FIG. 2, the mechanical actuator 134 cause a linear motion (not shown) to a clasp 136 which can release the clasp 136 from a location where it is held in place in an aperture (not shown), either through interfering with a magnetic attraction, or releasing a spring, or activating an electric motor to release the clasp 136, or any other opening mechanism that would be known to those of ordinary skill in the art. While the components 126/128 and 130 are shown on one side of the grill like support system 102, the components of the filter ejection system 100 can be located anywhere within the overall structure of the filter changing system 100.

The filter changing system 100 can also contain a notification device 138 that is electrically connected to the mechanical actuator 134 and which informs a user (not shown) with a notification that is audible or through a wireless communication to a device (not shown) of the user's, such as a cell phone, tablet, or lap-top computer (not shown). The notification device 138 can be an audible alarm.

Referring now to FIGS. 4-8, there is provided a filter changing system 100 in the CD format orientation. The filter changing system 100 shown in FIGS. 4-9 can be used in an air handler in an HVAC system, or in a furnace. The filter changing system 100 is located, in one non-limiting example, in an HVAC duct housing 140 which is shown in partial cut away in FIGS. 4-6 and in the full exterior view in FIGS. 7-8. Referring to FIG. 4, the arrows show the direction of air flow in the HVAC housing 140 from above the filter 114, therethrough, and below the filter 114 as the air is pulled in by the spinning air fan 142. The filter tray 116 supports the filter 114 by holding the filter 114 in a slight recess 104 (see FIG. 8) as shown in FIGS. 4 and 5 in the closed position. The substantial opening 124 in the filter tray 116 is shown in FIG. 8, when the filter 114 is removed. While not shown in FIG. 4, the fan can have a generator electrically connected thereto which can use the force of the air passing through the fan to charge the motor of the device.

Still referring to FIGS. 4-8, in the filter changing system 100 there is provided a filter ejection system which can comprise a determining component which can be a timer 126 (see FIG. 7) or a pressure transducer 128 which determines the filter change time, due to a preset time or differences in the pressure above and below the filter 114 as described above. There can be a relay 130 electrically connected by a wire 132 to the timer 126 (relay not shown in FIG. 7) or pressure transducer 128, which relay 132 is triggered by the filter change time. The filter ejection system can also comprise a mechanical actuator 134 (not shown) which is connected to the relay 130 by a wire 132 and can be located below the filter tray 116. The mechanical actuator 134 can actuate any of the means described above, such as a latch and clasp, an electric motor, a magnet attachment and the like which can release the filter tray 116 or cause the filter tray 116 to be ejected either slowly or quickly, depending on the mechanism employed. Then the mechanical actuator can also activate the notification device 138, be it an audible alarm (shown by speaker symbol in FIG. 7) and/or a wireless notification device 138 (shown by the circle next to successive arcs in FIG. 7).

Referring to FIGS. 4-6, the after the determining component 126/128 determines the filter change time, either through the time chosen for the timer expiring, or the pressure transducer detecting the preset difference in pressure between above and below the filter 114, such triggers through an electrical signal through wire 132 to the relay 130, which in turn transmits a signal down through wire 132 to the air fan 142, causing the fan 142 to stop rotating. Then the fan 142 sends a signal back through the wire 132 up to the relay 130 which by a wire 132 which goes up and under the filter 114, and connects electrically to a mechanical actuator 134 (not seen) which creates a linear motion which actuates an electric motor to release the tray 116 through a known belt and pulley system commonly used in CD trays, or releases a spring that has been restrained by a clasp or the like, or releases a magnetic attachment point to allow the tray 116 to be opened slowly or quickly. Thereafter the noted notification device 138 can cause the chosen notifications to be sent to the user (not shown) via audible signal and/or wireless communication. The system 100 can also comprise an optional release button for releasing the tray 116 to check the condition of the filter 114 in between the filter change times. Referring to FIG. 8, the arrows therein show the replacement of a dirty filter 114 (on the right) with a clean filter 114 (on the left). Thereafter the filter tray can be manually closed, and the determining component reset as would be known by those skilled in the art.

In one embodiment herein the filter changing notification system described herein can be a "green energy" type system in that it dramatically reduces the amount of energy that is needed to operate a system as described herein, e.g., an HVAC system. The filter changing notification system can reduce the energy required by at least 10%, preferably at least 25% than a HVAC system that does not employ the filter changing notification system described herein.

In an alternative non-limiting embodiment, the system is in the absence of any one or more of an air speed sensor, a rolls, rollers, rolls of filter material, and a robotic mechanism to move or replace the filter. In yet another alternative non-limiting embodiment, the system does not store or roll up the used filter material. In another alternative non-limiting embodiment, the filter is not moved and/or cannot be moved during the use of the system. In yet even another alternative non-limiting embodiment, the system is not an automatic system, and the replacement of the filter does not occur automatically.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A filter changing notification system comprising:
a filter tray for supporting a filter in an open or closed filter tray position, and which filter tray has a substantial opening therein;
a filter ejection system connected to the filter tray, which filter ejection system comprises:
a determining component that determines a filter change time,
a relay electrically connected to the determining component, which relay is triggered by the filter change time, and
a mechanical actuator electrically connected to the relay, which mechanical actuator ejects the filter tray from the closed position to the open position when the relay is triggered.

2. The filter changing notification system of claim 1, wherein the filter tray is angled down when in the open position.

3. The filter changing notification system of claim 2, further comprising a filter extension track which is configured to permit the filter tray to be slid down on when in the open position, and wherein the length of the extension track is at least two times the length of the filter tray.

4. The filter changing notification system of claim 1, wherein filter tray is a horizontally ejecting filter tray.

5. The filter changing notification system of claim 4, wherein the mechanical actuator is actuated by a belt and pulley system that is powered by an electric motor connected to the relay and/or the mechanical actuator.

6. The filter changing notification system of claim 1, wherein the determining component is a pressure transducer.

7. The filter changing notification system of claim 1, wherein the determining component is a timer.

8. The filter changing notification system of claim 1, further comprising a computer which computer, in response to detecting that the mechanical actuator has been actuated, is capable of issuing a notification that is generated and pushed to a user's device which informs that a filter should be replaced.

9. A device comprising the filter changing notification system of claim 1, wherein the device is selected from the group consisting of an HVAC system, a portable/window air conditioner, an air purifier, a heater, a dehumidifier and a clothes drier.

10. A filter changing notification system comprising:
a single substantially flat and substantially rigid filter;
a filter tray for supporting the filter in an open or closed filter tray position, and which filter tray has a substantial opening therein;
a filter ejection system connected to the filter tray, which filter ejection system comprises:
a determining component that determines a filter change time,
a relay electrically connected to the determining component, which relay is triggered by the filter change time, and
a mechanical actuator electrically connected to the relay, which mechanical actuator ejects the filter tray from the closed position to the open position when the relay is triggered; and,
a notification device that is electrically connected to the mechanical actuator and which informs a user with a notification that the filter is ready for manual replacement.

11. The filter changing notification system of claim 10, wherein the filter tray is angled down when in the open position.

12. The filter changing notification system of claim 11, further comprising a filter extension track which is configured to permit the filter tray to be slid down on when in the open position, and wherein the length of the extension track is at least two times the length of the filter tray.

13. The filter changing notification system of claim 10, wherein filter tray is a horizontally ejecting filter tray.

14. The filter changing notification system of claim 13, wherein the mechanical actuator is actuated by a belt and pulley system that is powered by an electric motor connected to the relay and/or the mechanical actuator.

15. The filter changing notification system of claim 10, wherein the determining component is a pressure transducer.

16. The filter changing notification system of claim 10, wherein the determining component is a timer.

17. The filter changing notification system of claim 10, further comprising a computer which computer, in response to detecting that the mechanical actuator has been actuated, is capable of issuing a notification that is generated and pushed to a user's device which informs that a filter should be replaced.

18. A device comprising the filter changing notification system of claim 10, wherein the device is selected from the group consisting of an HVAC system, a portable/window air conditioner, an air purifier, a heater, a dehumidifier and a clothes drier.

19. A method of notifying a user of a filter change time comprising:

providing the filter changing notification system of claim 10 to a filtration system;

waiting to receive the notification from the notification device; and, replacing a filter manually in the filter tray;

placing the filter tray in the closed position; and, resetting the determining component.

20. The method of claim 19 wherein the filtration system is present in a device selected from the group consisting of an HVAC system, a portable/window air conditioner, an air purifier, a heater, a dehumidifier, and a clothes drier.

* * * * *